(12) United States Patent
Ihara

(10) Patent No.: US 12,219,244 B2
(45) Date of Patent: Feb. 4, 2025

(54) IMAGE CAPTURE APPARATUS AND CONTROL METHOD THEREOF

(71) Applicant: CANON KABUSHIKI KAISHA, Tokyo (JP)

(72) Inventor: Kenta Ihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 18/168,035

(22) Filed: Feb. 13, 2023

(65) Prior Publication Data

US 2023/0269461 A1 Aug. 24, 2023

(30) Foreign Application Priority Data

Feb. 22, 2022 (JP) .................... 2022-025605

(51) Int. Cl.
| | |
|---|---|
| *H04N 23/60* | (2023.01) |
| *G03B 7/01* | (2021.01) |
| *G03B 7/091* | (2021.01) |
| *G03B 15/00* | (2021.01) |
| *G03B 19/02* | (2021.01) |
| *H04N 23/61* | (2023.01) |
| *H04N 23/661* | (2023.01) |
| *H04N 23/667* | (2023.01) |

(52) U.S. Cl.
CPC ............ *H04N 23/64* (2023.01); *H04N 23/61* (2023.01); *H04N 23/661* (2023.01); *H04N 23/667* (2023.01)

(58) Field of Classification Search
CPC ...... H04N 23/61; H04N 23/64; H04N 23/661; H04N 23/667; H04N 23/80; G03B 15/00; G03B 19/02; G03B 7/01; G03B 7/091
See application file for complete search history.

(56) References Cited

U.S. PATENT DOCUMENTS

| | | | |
|---|---|---|---|
| 9,600,724 B2 * | 3/2017 | Ko .................... | H04N 23/63 |
| 2024/0022810 A1 * | 1/2024 | Ogura ................ | G03B 15/00 |

FOREIGN PATENT DOCUMENTS

JP 2002-252804 A 9/2002

* cited by examiner

*Primary Examiner* — Marly S Camargo
(74) *Attorney, Agent, or Firm* — Cowan, Liebowitz & Latman, P.C.

(57) ABSTRACT

An image capture apparatus with a pre-capture function for generating still image data pieces at a predetermined interval during a pre-capture period between detection of a first shooting instruction and detection of a second shooting instruction, is disclosed. The apparatus determines, within the pre-capture period, a period in which one or more pre-captured still image data pieces are to be recorded in association with a still image data piece generated in response to the detection of the second shooting instruction. The period is determined based on a difference between (i) a time of the detection of the first shooting instruction, or a shooting time of an image data piece selected by a user from among the pre-captured still image data pieces, and (ii) a time of the detection of the second shooting instruction.

12 Claims, 5 Drawing Sheets

IMAGE CAPTURE APPARATUS AND CONTROL METHOD THEREOF

BACKGROUND OF THE INVENTION

Field of the Invention

The present invention relates to an image capture apparatus and a control method thereof.

Description of the Related Art

It has been known that an image capture apparatus, such as a digital camera, has a pre-capture function of starting recording of captured images from before a shooting instruction is input (Japanese Patent Laid-Open No. 2002-252804).

In a case where the pre-capture function is enabled, image data for recording is periodically generated during a pre-capture period from inputting of a shooting preparation instruction (e.g., an operation of depressing a shutter button halfway) to inputting of a shooting instruction (e.g., an operation of fully depressing the shutter button). Then, the image data pieces generated during the pre-capture period are recorded in addition to image data obtained in accordance with inputting of the shooting instruction.

Conventionally, all the image data pieces generated during the pre-capture period are recorded unconditionally and thus the capacity of a recording medium may be consumed significantly. Furthermore, an interval at which the image data is generated during the pre-capture period is constant, the interval may not be appropriate for a moving subject in some cases.

In view of the foregoing problems with conventional techniques, the present invention according to an embodiment thereof provides an image capture apparatus and a control method thereof that can flexibly control, for example, the number of image data pieces recorded using a pre-capture function and the interval of obtainment of the image data pieces.

SUMMARY OF THE INVENTION

According to an aspect of the present invention, there is provided an image capture apparatus with a pre-capture function for generating still image data pieces at a predetermined interval between detection of a first shooting instruction and detection of a second shooting instruction, the image capture apparatus comprising: one or more processors that execute a program stored in a memory and thereby function as: a control unit that determines, within a period in which the pre-capture function was performed, a period in which one or more still image data pieces generated through the pre-capture function are to be recorded in association with a still image data piece generated in response to the detection of the second shooting instruction, based on a difference between (i) a time of the detection of the first shooting instruction, or a shooting time of an image data piece selected by a user from among the still image data pieces generated through the pre-capture function, and (ii) a time of the detection of the second shooting instruction.

According to another aspect of the present invention, there is provided a control method executed by an image capture apparatus with a pre-capture function for generating still image data pieces at a predetermined interval between detection of a first shooting instruction and detection of a second shooting instruction, the control method comprising: determining, within a period in which the pre-capture function was performed, a period in which one or more still image data pieces generated through the pre-capture function are to be recorded in association with a still image data piece generated in response to the detection of the second shooting instruction, based on a difference between (i) a time of the detection of the first shooting instruction, or a shooting time of an image data piece selected by a user from among the still image data pieces generated through the pre-capture function, and (ii) a time of the detection of the second shooting instruction.

According to further aspect of the present invention, there is provided a non-transitory computer-readable medium that stores a program for causing a computer included in an image capture apparatus to execute a control method of the image capture apparatus, wherein the image capture apparatus has a pre-capture function for generating still image data pieces at a predetermined interval between detection of a first shooting instruction and detection of a second shooting instruction, and wherein the control method comprises: determining, within a period in which the pre-capture function was performed, a period in which one or more still image data pieces generated through the pre-capture function are to be recorded in association with a still image data piece generated in response to the detection of the second shooting instruction, based on a difference between (i) a time of the detection of the first shooting instruction, or a shooting time of an image data piece selected by a user from among the still image data pieces generated through the pre-capture function, and (ii) a time of the detection of the second shooting instruction.

Further features of the present invention will become apparent from the following description of exemplary embodiments (with reference to the attached drawings).

DESCRIPTION OF THE EMBODIMENTS

Figure 1:
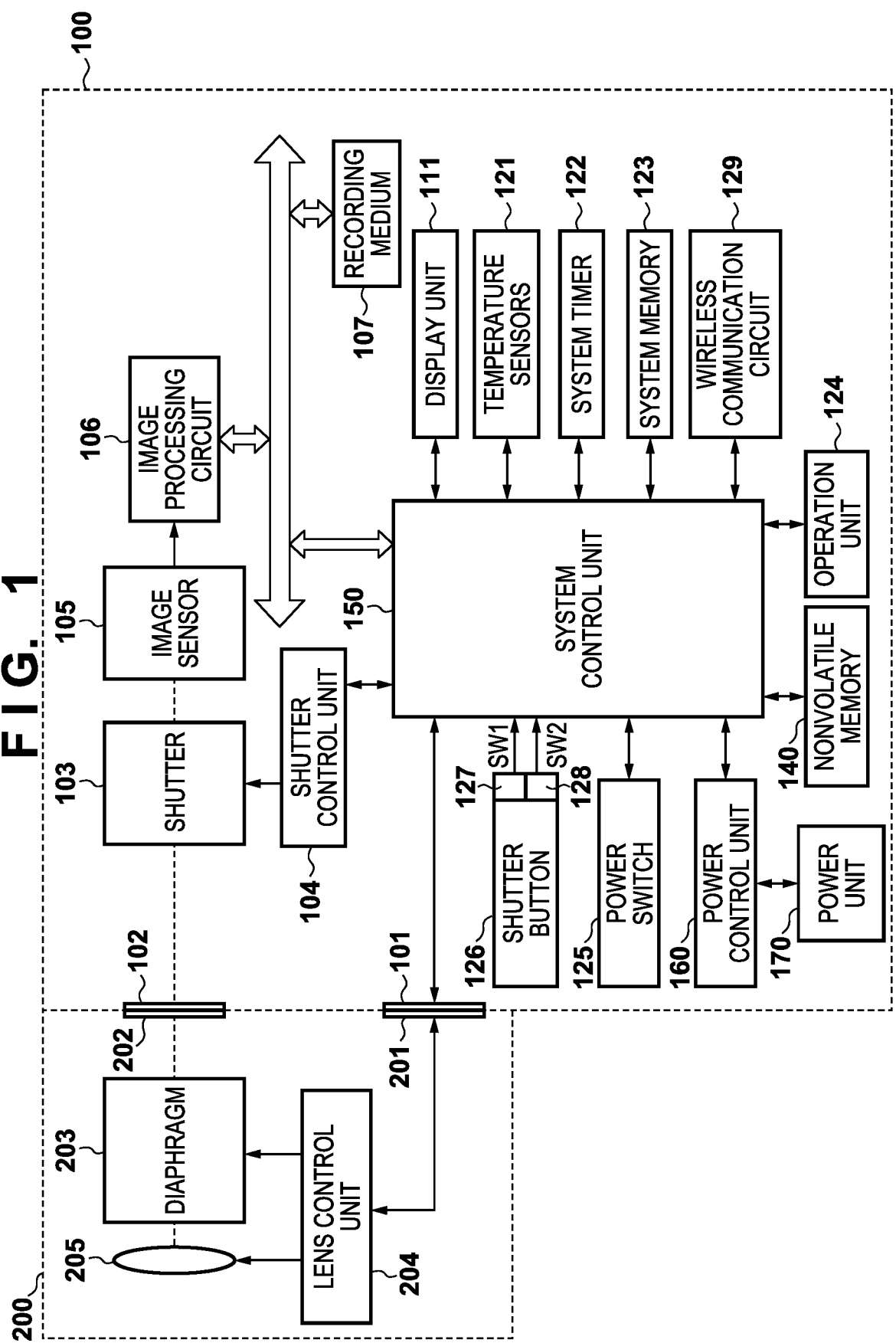
FIG. 1 is a block diagram showing an exemplary functional configuration of a camera system according to an embodiment.

Hereinafter, embodiments are described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiments are described in relation to a case where the present invention is implemented on an interchangeable-lens digital camera. However, the present invention can be also implemented on no particular electronic devices that have an image capture function. Such electronic devices include a video camera, a computer device (a personal computer, a tablet computer, a media player, a PDA, and so forth), a mobile telephone device, a smartphone, a game device, a robot, a drone, and a driving recorder. These are examples, and the present invention can be implemented on other electronic devices.

First Embodiment

FIG. 1 is a block diagram showing an exemplary functional configuration of a camera system according to an embodiment of the present invention. The camera system includes a main body 100 and a lens unit 200. Although the lens unit 200 is attachable to and removable from the main body 100 in the present embodiment, the lens unit 200 may be integrated with the main body 100.

The lens unit 200 includes a mount unit 202 that is mechanically attachable to and removable from a mount unit 102 of the main body 100. Also, the lens unit 200 and the main body 100 are capable of communicating with each other via contact points 201 and 101, which come into contact with each other when the lens unit 200 is mounted on the main body 100. Furthermore, electric power that enables the lens unit 200 to operate is supplied from the main body 100 to the lens unit 200 via the contact points 201 and 101.

The lens unit 200 includes an imaging optical system 205, a diaphragm 203, and a lens control unit 204. The imaging optical system 205 includes a plurality of lenses including a focusing lens, and forms an optical image on an image capture surface of an image sensor 105. The diaphragm 203 adjusts the amount of light incident from the lens unit 200 to the main body 100 by way of the aperture size. The lens control unit 204 drives the focusing lens and the diaphragm 203 of the imaging optical system 205 under control of a system control unit 150.

The lens control unit 204 includes, for example, a processor capable of executing programs, and memories (a ROM and a RAM). The lens control unit 204 realizes the functions of the lens unit 200 by loading the programs stored in the ROM to the RAM and executing the programs using the processor. The ROM stores not only the programs, but also constants and variables for the operations, as well as unique information (e.g., a serial number), management information (e.g., a product name), function information (e.g., a maximum aperture, a minimum aperture, and a focal length), current and past setting values, and the like of the lens unit 200.

In response to a request from the system control unit 150, the lens control unit 204 transmits information of the lens unit 200 (information stored in the ROM, and information indicating the current state (the aperture, the position of the focusing lens, and so forth)) to the system control unit 150. Furthermore, in response to a request from the system 150, the lens control unit 204 drives the diaphragm 203, and the focusing lens of the imaging optical system 205.

In the main body 100, a shutter 103 is a mechanical shutter, and controls an exposure period of the image sensor 105. Under control of the system control unit 150, a shutter control unit 104 controls the opening/closing operation of the shutter 103.

The image sensor 105 may be a known CCD or CMOS color image sensor including, for example, color filters based on the primary-color Bayer array. The image sensor 105 includes a pixel array in which a plurality of pixels are arrayed two-dimensionally, and peripheral circuits for reading out signals from the pixels. In each pixel, charges corresponding to the amount of incident light are accumulated through photoelectric conversion. A signal having a voltage corresponding to the amount of charges accumulated during an exposure period is read out from each pixel; as a result, a group of pixel signals (analog image signals) indicating an optical image formed by the image capture optical system 205 on the image capture surface is obtained. The analog image signals are supplied to an image processing circuit 106.

The image processing circuit 106 applies pre-set image processing to the analog image signals, thereby generating signals and image data corresponding to the intended use, and obtaining and/or generating various types of information. The image processing circuit 106 may be, for example, a dedicated hardware circuit designed to realize specific functions, such as an Application Specific Integrated Circuit (ASIC). Alternatively, the image processing circuit 106 may be configured to realize specific functions as a result of a processor, such as a Digital Signal Processor (DSP) and a Graphics Processing Unit (GPU), executing software.

The image processing applied by the image processing circuit 106 can include, for example, preprocessing, color interpolation processing, correction processing, detection processing, data editing processing, evaluation value calculation processing, special effects processing, and the like.

The preprocessing can include A/D conversion, signal amplification, base level adjustment, defective pixel correction, and the like.

The color interpolation processing is executed in a case where the image sensor 105 includes color filters, and is processing for interpolating the values of color components that are not included in discrete pixel data pieces that compose image data. The color interpolation processing is also referred to as demosaicing processing.

The correction processing can include processing such as white balance adjustment, tone correction, correction of image deterioration caused by optical aberration of the imaging optical system 101 (image recovery), correction of the influence of vignetting of the image capture optical system 101, correction of the influence of vignetting of the image capture optical system 205, color correction, and the like.

The detection processing can include detection of a characteristic region (e.g., a face region and a human body region) and movements thereof, processing for recognizing a person, and the like.

The data editing processing can include processing such as composition, scaling, encoding and decoding, and generation of header information (generation of a data file). The data editing processing also includes generation of image data for display and image data for recording.

The evaluation value calculation processing can include processing such as generation of signals and evaluation values used in automatic focus detection (AF), and generation of evaluation values used in automatic exposure control (AE).

The special effects processing can include, for example, processing such as addition of blur effects, changing of tones, and relighting.

Note that these are examples of processing that can be applied by the image processing circuit 106, and do not limit processing applied by the image processing circuit 106.

A recording medium 107 is, for example, a semiconductor memory card. Still image data and moving image data for recording generated by the image processing circuit 106 are recorded into the recording medium 107 by the system control unit 150.

A display unit 111 is, for example, a liquid crystal display (LCD). The display unit 111 functions as an electronic viewfinder (EVF) by displaying live view images. Also, the display unit 111 displays a GUI such as a menu screen, image data recorded in the recording medium 107, and the like. The display unit 111 may be a touch display.

A temperature sensors 121 are disposed in a plurality of areas of the main body 100, and supply a signal indicating a temperature therearound to the system control unit 150.

An operation unit 124 is a collective term for input devices (buttons, switches, dials, and the like) that have been provided to enable a user to input various types of instructions to the main body 100, except for a shutter button 126 and a power switch 125. The input devices that compose the operation unit 124 have names corresponding to the allocated functions. For example, the operation unit 124 includes a moving image recording switch, a shooting mode selection dial for selecting a shooting mode, a menu button, directional keys, a determination key, and the like. Note that the functions allocated to the same input device may be variable. Also, the input devices may be software buttons or keys that use a touch display. Furthermore, input devices that do not require mechanical operations, such as an eye-gazing input device and sound input device, may be used.

The power switch 125 switches between a state where a power control unit 160 supplies electric power to the main body 100 (power ON) and a state where no electric power is supplied thereto (power OFF). Note that there may be a constituent element to which electric power is supplied even during the power OFF state.

The shutter button 126 is a button for recording still images, and includes a switch (SW1) 127 that is turned ON by a halfway-depression operation, and a switch (SW2) 128 that is turned ON by a full-depression operation.

The system control unit 150 monitors the operation unit 124; it recognizes depression of the moving image recording switch in a shooting standby state as a recording start instruction for moving images, and recognizes depression of the moving image recording switch during the recording of moving images as a recording stop instruction.

The system control unit 150 is, for example, a processor capable of executing programs. The system control unit 150 controls the operations of the main body 100 and the lens unit 200 by reading in programs stored in a nonvolatile memory 140 to a system memory 123 and executing the programs. The control performed by the system control unit 150 realizes various functions of the camera system.

The system control unit 150 recognizes the act of turning ON the SW1 127 as a shooting preparation instruction (a first shooting instruction), and the act of turning ON the SW2 128 as a shooting start instruction (a second shooting instruction). Upon detecting the shooting preparation instruction, the system control unit 150 performs an operation of determining exposure conditions (AE) and an operation of automatic focus detection (AF) of the lens unit 200, and waits for the shooting start instruction. Also, in a case where a pre-capture function is enabled, the system control unit 150 starts pre-capture in response to the detection of the shooting preparation instruction.

The nonvolatile memory 140 is, for example, electrically rewritable, and stores programs to be executed by the system control unit 150, various types of setting values of the main body 100, GUI data, and so forth.

The system memory 123 is, for example, a RAM, and is a main memory that is used by the system control unit 150 when executing programs. A part of the system memory 123 is used as a video memory for the display unit 111, and used as a data buffer memory.

A system timer 122 measures a period set by the system control unit 150, and provides a clock function.

A wireless communication circuit 129 includes a transmission/reception circuit conforming to one or more of predetermined wireless communication standards (e.g., a wireless LAN and Bluetooth®)). The main body 100 can receive a shooting instruction from an external device connected via the wireless communication circuit 129. Also, in the nonvolatile memory 140, a delay period that should be taken into consideration in relation to communication via the wireless communication circuit 129 is stored for each communication standard.

A power unit 170 is a power source capable of supplying electric power to the main body 100, such as a battery and an AC adapter.

The power control unit 160 includes a battery detection circuit, a protection circuit, a DC-DC converter, an LDO regulator, and so forth, and supplies electric power from the power unit 170 to the camera system in a form suitable to the supply destination. The power control unit 160 detects, for example, the type of the power unit 170, and the type and the remaining level of a mounted battery. Also, the power control unit 160 blocks electric power from the power unit 170 in a case where overcurrent has been detected.

Figure 2:
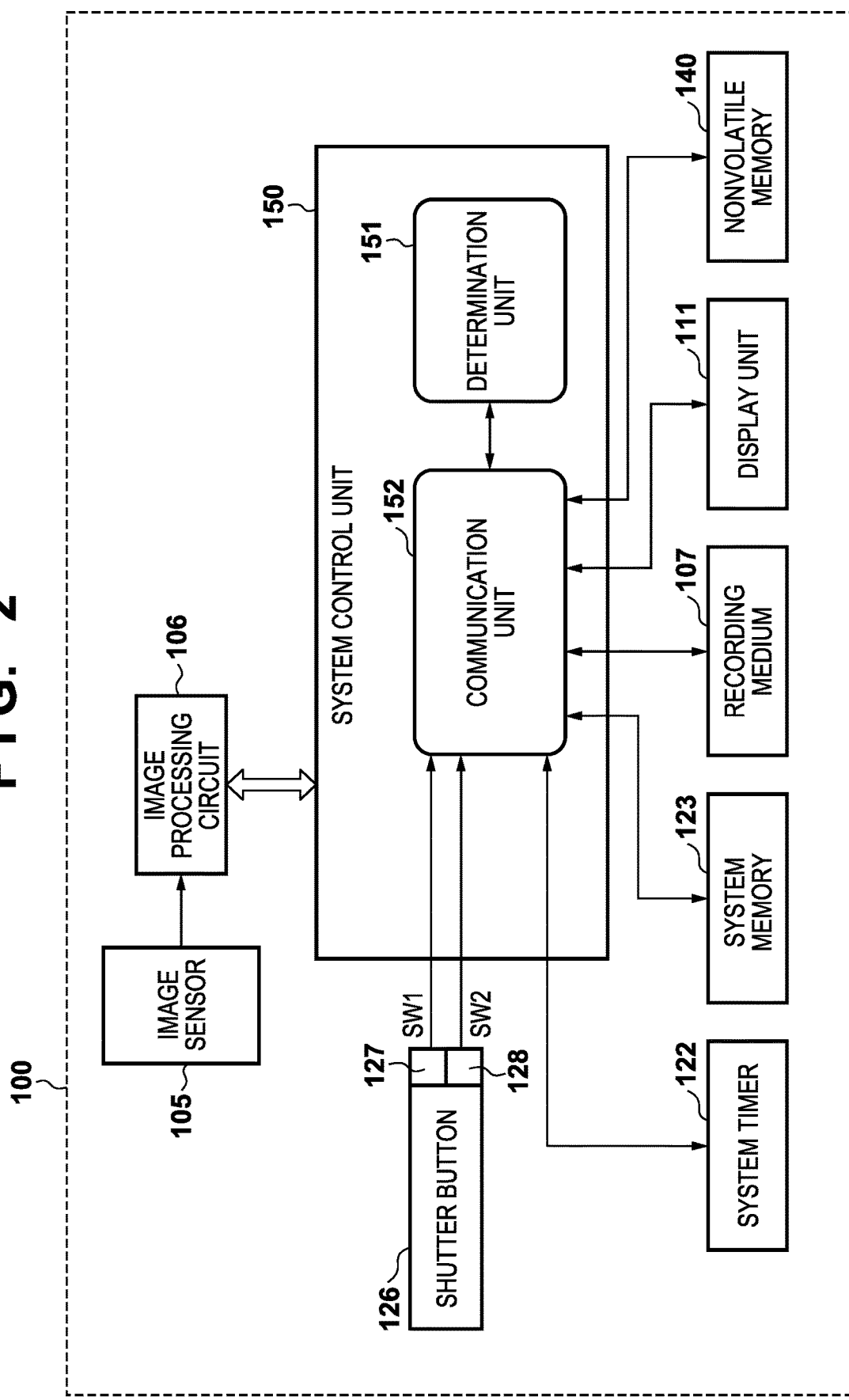
FIG. 2 is a schematic diagram for describing the operations of the camera system according to an embodiment.

FIG. 2 is a schematic diagram for describing the operations of the system control unit 150 related to the pre-capture function. A communication unit 152 and a determination unit 151 included in the system control unit 150 are functions which are realized by the processor executing programs, and which are represented as a plurality of function blocks in order to facilitate the description and understanding.

The communication unit 152 communicates with function blocks connected to the system control unit 150. The determination unit 151 controls the operations of the main body 100 and the lens unit 200 based on information obtained via the communication unit 152.

As stated earlier, in the present embodiment, when the SW1 127 is turned ON by the operation of depressing the shutter button 126 halfway, shooting preparation operations for a still image are executed, and in addition to this, pre-capture is started. Note that in the pre-capture, one of the following may be performed: (1) record still image data for recording that has been generated by the image processing circuit 106 from moving image frames that have been obtained for the purpose of live-view display in the shooting standby state; and (2) start an operation of continuously shooting still images using an electronic shutter or the shutter 103, and record still image data for recording that has been generated by the image processing circuit 106. In the case of (1), there is a case where the resolution of still images recorded in the pre-capture is lower than the resolution of a still image recorded when the shutter button 126 is fully depressed. Also, in the case of (2), there is a case where live-view display is not performed during the pre-capture.

Note that the system control unit 150 (communication unit 152) stores still image data that has been generated through the pre-capture to the system memory 123, with time information obtained from the system timer 122 added thereto. The communication unit 152 updates still image data within a buffer so that the most recent still image data corresponding to a predetermined period or number of frames is buffered in the system memory 123 while using a period or the number of frames corresponding to a preset buffer capacity as a limit.

When the SW2 128 is turned ON by the operation of fully depressing the shutter button 126, the determination unit 151 ends the pre-capture, and executes a still image shooting operation. Then, the determination unit 151 adds time information obtained from the system timer 122 to still image data for recording that has been generated by the image processing circuit 106, and then records the still image data for recording, together with the pre-captured still image data, into the recording medium 107. In the present embodiment, every still image data piece that has been pre-captured is not recorded unconditionally, but the number of frames to be recorded is reduced in view of the tendency of the photographer.

Figure 3:
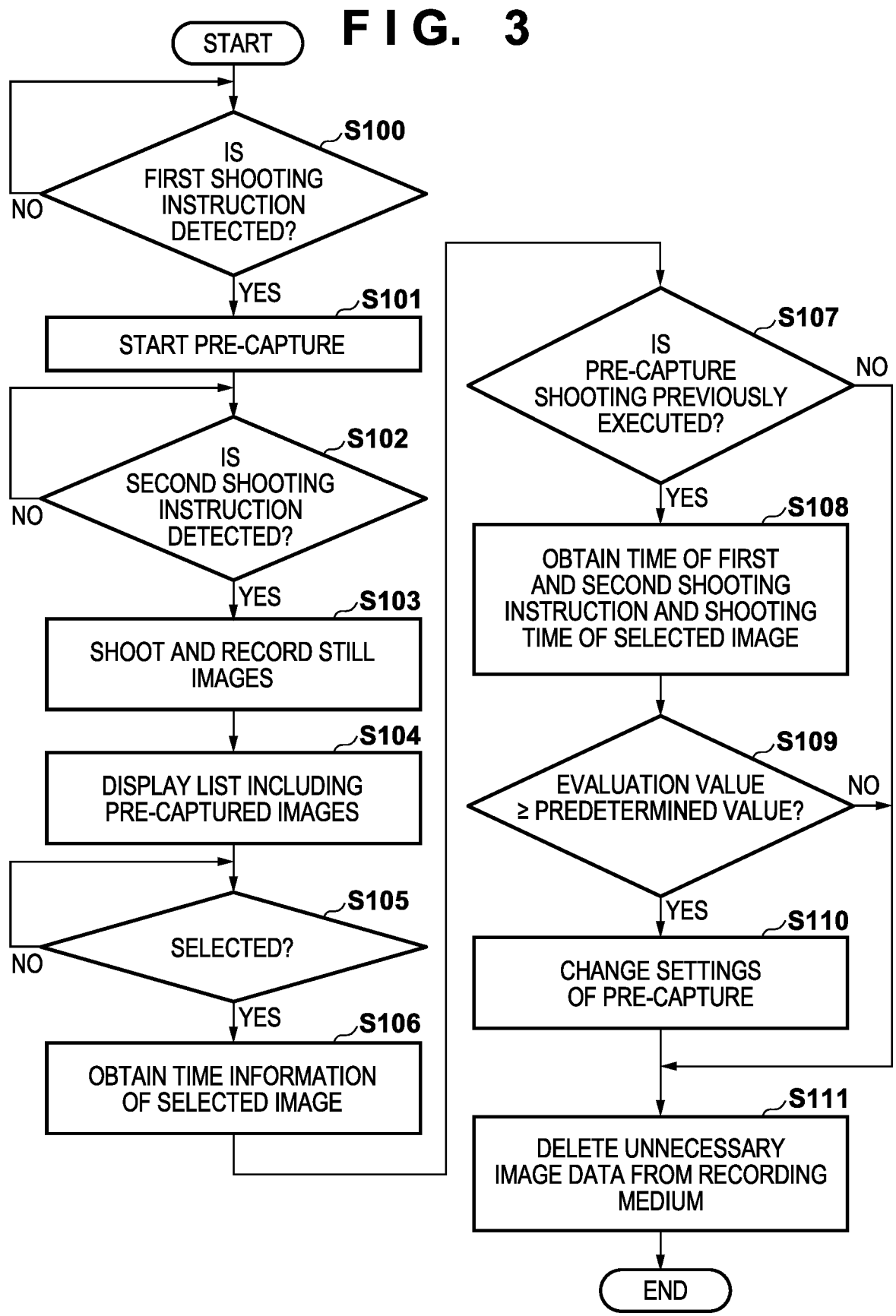
FIG. 3 is a flowchart showing the operations of a main body 100 according to a first embodiment.

Using a flowchart of FIG. 3, the following describes a still image shooting operation that accompanies the pre-capture according to the present embodiment. Here, it is assumed that the camera system is in the shooting standby state, and is monitoring operations on the shutter button 126 while performing live-view display on the display unit 111.

In step S100, the system control unit 150 determines whether the first shooting instruction (ON of the SW1 127) has been detected; step S101 is executed when it is determined that the first shooting instruction has been detected, and step S100 is repeatedly executed when it is not determined that the first shooting instruction has been detected.

In step S101, the system control unit 150 obtains current time information from the system timer 122, and stores the same to the system memory 123 as the time of the first shooting instruction. Also, the system control unit 150 starts a pre-capture operation. Accordingly, the image processing circuit 106 starts generating pre-captured still image data pieces for recording. The pre-captured still image data pieces include shooting time information obtained from the system timer 122 added thereto, and are sequentially buffered in the system memory 123.

In step S102, the system control unit 150 determines whether the second shooting instruction (ON of the SW2 128, or an input from an external apparatus) has been detected; step S103 is executed when it is determined that the second shooting instruction has been detected, and step S102 is repeatedly executed when it is not determined that the second shooting instruction has been detected.

In step S103, the system control unit 150 obtains current time information from the system timer 122, and stores the same to the system memory 123 as the time of the second shooting instruction. Note that in a case where the second shooting instruction has been received from an external apparatus, the system control unit 150 obtains, from the nonvolatile memory 140, a delay amount corresponding to the standard that is used in wireless connection to the external apparatus, corrects the time of the second shooting instruction, and stores the corrected time to the system memory 123. Specifically, the system control unit 150 corrects the time of the second shooting instruction to the time obtained by subtracting the delay amount from the time obtained from the system timer 122.

Also, the system control unit 150 stops the pre-capture operation, and executes a still image shooting (main shooting) operation based on the second shooting instruction. A still image data piece for recording pertaining to the present shooting, which has been generated by the image processing circuit 106, includes the time of the second shooting instruction added thereto, and is buffered in the system memory 123. Thereafter, the system control unit 150 records the pre-captured still image data pieces and the still image data piece pertaining to the present shooting, which have been buffered in the system memory 123, into the recording medium 107 in association with one another.

In step S104, the system control unit 150 displays a list of reduced images (e.g., thumbnail images) based on the still image data pieces recorded in step S103 on the display unit 111 in a selectable manner, and causes the user to select an image that is desired to be stored.

In step S105, the system control unit 150 determines whether an image has been selected, via an operation on the operation unit 124, from the displayed list. The system control unit 150 executes step S106 when it is determined that an image has been selected, and repeatedly executes step S105 when it is not thus determined. The operation of selecting an image may be any known operation, such as a touch operation on a reduced image, and an operation that uses a cursor. Note that a selection of a plurality of images may be permitted.

In step S106, the system control unit 150 obtains shooting time information from the still image data piece corresponding to the selected image, and stores the shooting time information to the system memory 123. Also, the system control unit 150 stores the oldest time among the obtained times to the nonvolatile memory 140.

In step S107, the system control unit 150 determines whether the pre-capture was performed in the past. In a case where one or more shooting times are stored in the nonvolatile memory 140, the system control unit 150 determines that the pre-capture was performed in the past, and executes step S108.

Also, in a case where a shooting time is not stored in the nonvolatile memory 140, the system control unit 150 determines that the pre-capture was not performed in the past, and executes step S111. In this case, the period for which the pre-capture is performed, or the number of frames to be pre-captured, is not changed.

In step S108, the system control unit 150 obtains the time of the first shooting instruction, the time of the second shooting instruction, and the old shooting time of the image selected in step S104 from the nonvolatile memory 140.

In step S109, the system control unit 150 calculates an evaluation value based on the times obtained in step S108. The evaluation value may be, for example, one of the following.

(1) An average value of the difference between the time of the second shooting instruction and the time of the first shooting instruction (2) A variation (variance or standard deviation) in the difference between the time of the second shooting instruction and the time of the first shooting instruction (3) An average value of the difference between the time of the second shooting instruction and the shooting time of the selected image (4) A variation (variance or standard deviation) in the difference between the time of the second shooting instruction and the shooting time of the selected image Provided that the calculated time difference is x, the number of samples of x is n, and the average value of the samples is $\bar{x}$, the standard deviation s is derived as follows.

$$s = \sqrt{\frac{1}{n} * \sum_{i=1}^{n}(x_i - \bar{x})^2}$$

Then, the system control unit 150 determines whether the shooting settings related to the pre-capture are to be changed based on the calculated evaluation value; step S110 is executed in a case where it is determined that the shooting settings are to be changed, and step S111 is executed in a case where it is determined that the shooting settings are not to be changed.

Here, as one example, the system control unit 150 determines that the shooting settings related to the pre-capture are to be changed when the evaluation value is equal to or larger than a predetermined value (threshold) that has been set in advance, and determines that the shooting settings related to the pre-capture are not to be changed when the evaluation value is smaller than the threshold. Note that different predetermined values can be used for different evaluation values.

The system control unit 150 can determine that the shooting settings related to the pre-capture are to be changed, for example, in a case where the evaluation value (1) is equal to or longer than one minute, or in a case where the evaluation value (4) (standard deviation) is equal to or longer than 30 seconds.

In step S110, the system control unit 150 changes the settings related to the pre-capture. For example, the system control unit 150 makes the change so that, among the image data pieces obtained during the pre-capture period, only the image data pieces obtained during a period based on the average value of the difference between the shooting time of the selected image and the time of the second shooting instruction are recorded.

The difference between the shooting time of the selected image and the time of the second shooting instruction reflects a time difference (response time) between the timing at which the user determined to perform the shooting and the time when the shutter button 126 was actually depressed fully, and is considered to be information unique to the user. Therefore, recording the image data pieces obtained during a period based on the average value of this time difference makes it possible to reduce the consumption of the capacity of the recording medium 107 caused by recording of image data pieces that are not desired by the user, while increasing the possibility of recording of image data pieces desired by the user.

As one example, the system control unit 150 can make the change so as to record only the image data pieces obtained during a period obtained by subtracting (the sum of the average value of the difference between the shooting time of the selected image and the time of the second shooting instruction, and the standard deviation of the difference) from the time of the second shooting instruction. In this way, presuming that the time difference is normally distributed, the image data pieces desired by the user are recorded with a probability of approximately 70%. Note that although the period obtained by subtracting the sum of the average value of the difference and the standard deviation of the difference is used here, it is permissible to use a range obtained by subtracting the sum of the average value of the difference and a multiple (equal to or larger than one-fold, and equal to or smaller than two-fold) of the standard deviation of the difference.

In step S111, the system control unit 150 deletes, from the recording medium 107, unnecessary image data pieces that are included among the still image data pieces recorded in step S103. In a case where the transition has been made, for example, from step S107 or S109 to step S111, the unnecessary image data pieces may be still image data pieces that have not been selected on a screen displaying the list. On the other hand, in a case where the transition has been made from step S110 to step S111, the unnecessary image data pieces may be image data pieces which are included among the still image data pieces recorded in step S103 and which are not included in the period changed in step S110. Note that the deletion in step S111 may not be performed.

The period changed in step S110 is reflected at the time of the next shooting, thereby changing the amount of still image data pieces recorded in step S103.

(Exemplary Modifications)

In step S110, the period for which image data pieces are recorded during the pre-capture period is changed; however, the interval of obtainment of image data pieces may further be changed. For example, the interval of obtainment of still image data pieces for recording can be shortened (the frequency of the obtainment is increased) in a case where the length of the period for which image data pieces are recorded that was changed in step S110 is equal to or shorter than a predetermined length, or in a case where the evaluation value is smaller than the predetermined value. As a result, the shooting interval is shortened, and more fine-tuned pre-capture can be realized, thereby increasing the possibility of obtainment of images that match the user's intention through the pre-capture.

Furthermore, for example, in comparing the interval of obtainment of image data pieces in one of the following periods, which have been described earlier, with the interval of obtainment of image data pieces outside these periods, the change may be made so as to increase the interval of obtainment of (reduce the frequency of obtainment of) image data pieces outside these periods:

(1) A period based on the average value of the difference between the shooting time of the selected image and the time of the second shooting instruction;

(2) A period obtained by subtracting (the sum of the average value of the difference between the shooting time of the selected image and the time of the second shooting instruction, and the standard deviation of the difference) from the time of the second shooting instruction; and (3) A period obtained by obtained by subtracting the sum of the average value of the difference and a multiple (equal to or larger than one-fold, and equal to or smaller than two-fold) of the standard deviation of the difference.

As a result, the number of frames of image data pieces outside these periods is reduced; this can reduce the consumption of the capacity of the recording medium 107 caused by recording of image data pieces that are not desired by the user.

Note that in a case where the length of the period has been changed in step S110, the number of frames of image data pieces obtained at the shortened obtainment interval should not exceed the number of frames of image data pieces obtained during the length of the period before the change in step S110. Furthermore, the obtainment interval is shortened so that there is no shortage in the amount of exposure for the obtained image data pieces.

As described above, according to the present embodiment, the period for which the obtained image data pieces are to be recorded during the pre-capture period is changed based on the difference between the shooting time of the image selected by the user and the time of the second shooting instruction. This enables recording of only the image data pieces that were obtained in a period in which the user's characteristics are reflected during the pre-capture period, and unnecessary consumption of the storage capacity of the recording medium and electric power can be suppressed.

Furthermore, in a case where the length of the changed period is equal to or shorter than the predetermined length, the pre-capture can be performed at a more fine-tuned time interval by increasing the interval of obtainment of image data pieces.

Second Embodiment

Figure 4:
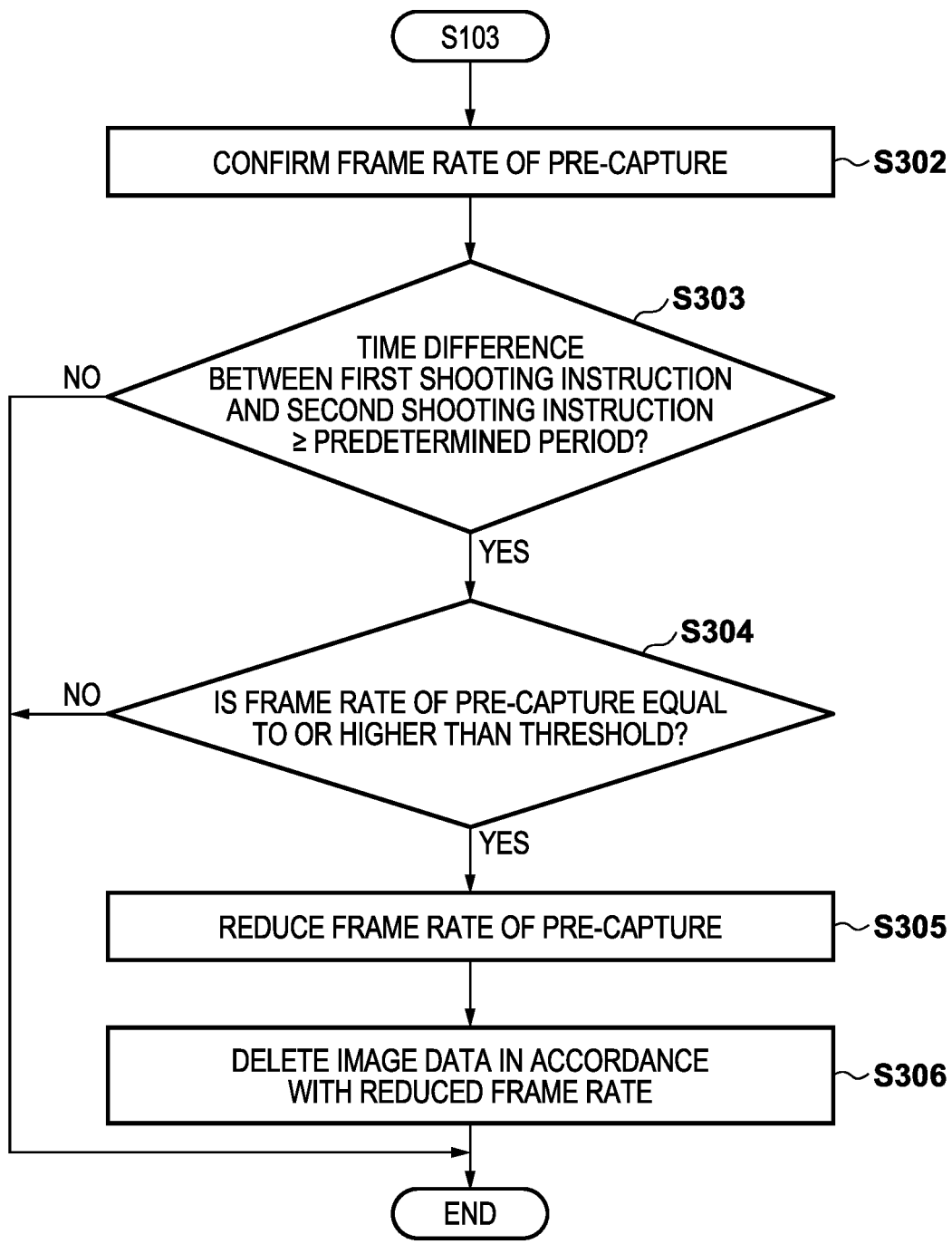
FIG. 4 is a flowchart showing the operations of the main body 100 according to a second embodiment.

Next, a second embodiment of the present invention is described using a flowchart shown in FIG. 4. The present embodiment can be implemented following step S103 of the first embodiment. After image data has been recorded into the recording medium 107 in response to the second shooting instruction, the system control unit 150 obtains the setting of the frame rate (obtainment interval) of the pre-capture from, for example, the nonvolatile memory 140 in step S302.

In step S303, the system control unit 150 calculates a time difference between the time of the first shooting instruction and the time of the second shooting instruction. Furthermore, the system control unit 150 determines whether the calculated time difference is equal to or longer than a predetermined period that has been set in advance. It is assumed here that the predetermined period is, for example, 30 seconds. The system control unit 150 executes step S304 when it is determined that the time difference is equal to or longer than the predetermined period, and ends processing without changing the frame rate of the pre-capture when it is not thus determined.

In step S304, the system control unit 150 determines whether the frame rate of the pre-capture obtained in step S302 is equal to or higher than a threshold (e.g., 20 fps); processing proceeds to step S305 when it is determined that the frame rate of the pre-capture is equal to or higher than the threshold, and processing is ended without changing the frame rate of the pre-capture when it is not thus determined. This determination may be a determination of whether the interval at which still image data pieces are generated using the pre-capture function is lower than a threshold.

In step S305, the system control unit 150 reduces the frame rate of the pre-capture (to, for example, 10 fps) (increases the interval at which still image data pieces are generated).

In step S306, the system control unit 150 thins out (deletes) image data pieces which are included among the image data pieces recorded into the recording medium 107 in step S103 and which were obtained through the pre-capture, so as to achieve the reduced frame rate.

According to the present embodiment, in a case where the time difference between the time of the first shooting instruction and the time of the second shooting instruction has a length equal to or longer than a predetermined value, the capacity of the recording medium 107 can be saved by reducing the frame rate of image data pieces recorded through the pre-capture.

Note that the present embodiment may be combined with the first embodiment, and processing of step S104 onward of FIG. 3 may be executed following the flowchart of FIG. 4.

Third Embodiment

Figure 5:
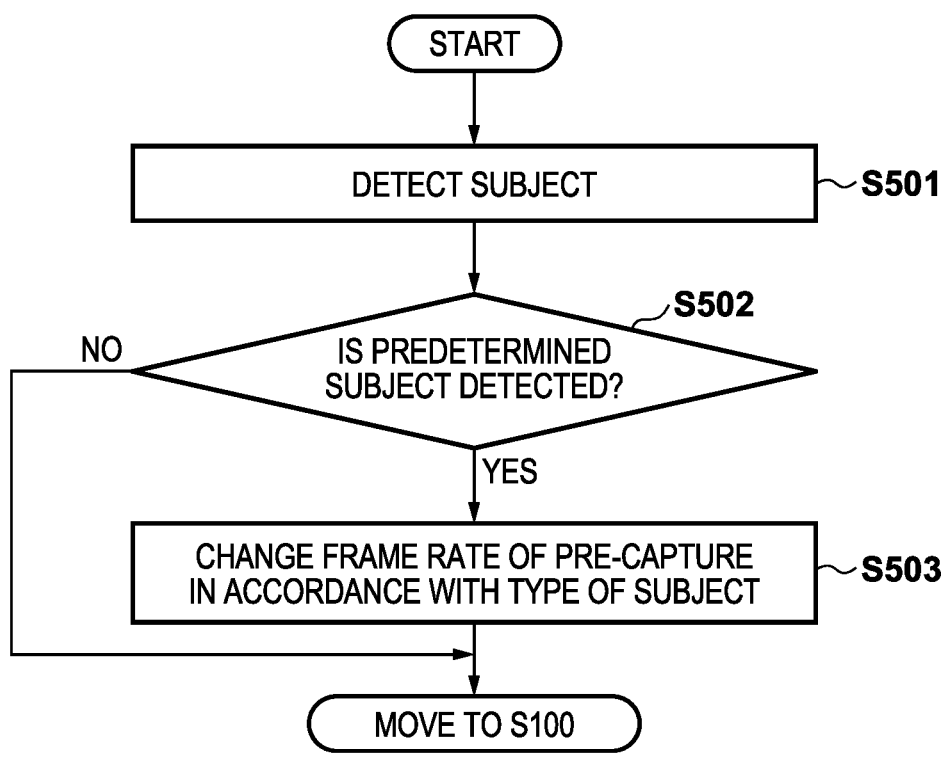
FIG. 5 is a flowchart showing the operations of the main body 100 according to a third embodiment.

Next, a third embodiment of the present invention is described using a flowchart shown in FIG. 5. The present embodiment can be executed at the time of standby for shooting, prior to processing of the flowchart of FIG. 3 that has been described in the first embodiment.

In step S501, the system control unit 150 obtains the result of subject detection processing that has been executed by the image processing circuit 106 with respect to images for live-view display.

In step S502, the system control unit 150 determines whether a pre-set subject has been detected through the subject detection processing; step S503 is executed when it is determined that the predetermined subject has been detected, and processing from step S100 is executed without changing the frame rate of the pre-capture when it is not thus determined.

Here, the pre-set subject is a movable subject, and examples thereof include a person, an animal, an insect, a vehicle, a flying object, and so forth.

In step S503, the system control unit 150 sets (changes) the frame rate of the pre-capture in accordance with the type of the detected subject. Specifically, the frame rate is set so that it increases as the speed at which the subject can move increases. A relationship between the subject types and the speeds at which the subject can move can be registered in, for example, the nonvolatile memory 140 in advance.

For example, frame rates can be registered in accordance with the following magnitude relationship: a subject represented by a person, an insect, or an animal<a subject represented by a vehicle<a subject represented by a flying object. Note that this is one example, and frame rates may be registered in correspondence with more detailed categories, respectively; for instance, the frame rate corresponding to a subject represented by an animal may vary depending on the type of the animal. The number of categories of subjects can vary depending on, for example, the subject detection capability of the image processing circuit 106.

In the present embodiment, by setting the frame rate of the pre-capture in accordance with a detected subject, the pre-capture can be executed at a shooting interval appropriate for the subject. This can increase the possibility that a subject can be pre-captured at a timing intended by the user. Furthermore, setting of an excessive frame rate for a subject can be avoided, and an increase in the amount of image data attributed to the pre-capture can be suppressed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-25605, filed on Feb. 22, 2022, which is hereby incorporated by reference herein in its entirety.

What is claimed is:

1. An image capture apparatus with a pre-capture function for generating still image data pieces at a predetermined interval between detection of a first shooting instruction and detection of a second shooting instruction, the image capture apparatus comprising:
   one or more processors that execute a program stored in a memory and thereby function as:
   a control unit that determines, within a period in which the pre-capture function was performed, a period in which one or more still image data pieces generated through the pre-capture function are to be recorded in association with a still image data piece generated in response to the detection of the second shooting instruction, based on a difference between (i) a time of the detection of the first shooting instruction, or a shooting time of an image data piece selected by a user from among the still image data pieces generated through the pre-capture function, and (ii) a time of the detection of the second shooting instruction.

2. The image capture apparatus according to claim 1, wherein
   the control unit determines the period in which one or more still image data pieces generated through the pre-capture function are to be recorded using the difference at the time of past execution of the pre-capture function.

3. The image capture apparatus according to claim 2, wherein
   the control unit determines the period in which one or more still image data pieces generated through the pre-capture function are to be recorded based on an average value of the differences.

4. The image capture apparatus according to claim 2, wherein
   the control unit determines, as the period in which one or more still image data pieces generated through the pre-capture function are to be recorded, a period between the time of the detection of the second shooting instruction and a time that is backward from the time when the second shooting instruction is detected by the average of the differences.

5. The image capture apparatus according to claim 2, wherein
   the control unit determines the period in which one or more still image data pieces generated through the pre-capture function are to be recorded based on an average value and a standard deviation of the differences.

6. The image capture apparatus according to claim 5, wherein
   the control unit determines, as the period in which one or more still image data pieces generated through the pre-capture function are to be recorded, a period between the time of the detection of the second shooting instruction and a time that is backward from the time when the second shooting instruction is detected by a sum of the average of the differences and a multiple of the standard deviation of the differences.

7. The image capture apparatus according to claim 1, wherein
   in a case where the period in which one or more still image data pieces generated through the pre-capture function are to be recorded is equal to or shorter than a predetermined length, the control unit decreases an interval at which the still image data pieces are generated through the pre-capture function compared to a case where the period in which one or more still image data pieces generated through the pre-capture function are to be recorded is not equal to or shorter than the predetermined length.

8. The image capture apparatus according to claim 1, further comprising
   a wireless communication circuit,
   wherein in a case where the second shooting instruction has been received from an external apparatus via the wireless communication circuit, the control unit corrects the time of the detection of the second shooting instruction based on a delay amount in wireless communication.

9. The image capture apparatus according to claim 1, wherein
   in a case where the difference between the time of the detection of the first shooting instruction and the time of the detection of the second shooting instruction is equal to or longer than a predetermined period, and an interval at which the still image data pieces are generated through the pre-capture function is smaller than a threshold, the control unit increases the interval.

10. The image capture apparatus according to claim 1, further comprising
    an image processing circuit that executes subject detection processing with respect to a shot image,
    wherein in a case where a pre-set subject has been detected as a result of the subject detection processing, the control unit changes a setting of the pre-capture function so as to generate still image data pieces at a pre-set interval in accordance with a type of the detected subject.

11. A control method executed by an image capture apparatus with a pre-capture function for generating still image data pieces at a predetermined interval between detection of a first shooting instruction and detection of a second shooting instruction, the control method comprising:
    determining, within a period in which the pre-capture function was performed, a period in which one or more still image data pieces generated through the pre-capture function are to be recorded in association with a still image data piece generated in response to the detection of the second shooting instruction, based on a difference between (i) a time of the detection of the first shooting instruction, or a shooting time of an image data piece selected by a user from among the still image data pieces generated through the pre-capture function, and (ii) a time of the detection of the second shooting instruction.

12. A non-transitory computer-readable medium that stores a program for causing a computer included in an image capture apparatus to execute a control method of the image capture apparatus, wherein the image capture apparatus has a pre-capture function for generating still image data pieces at a predetermined interval between detection of a first shooting instruction and detection of a second shooting instruction, and wherein the control method comprises:

determining, within a period in which the pre-capture function was performed, a period in which one or more still image data pieces generated through the pre-capture function are to be recorded in association with a still image data piece generated in response to the detection of the second shooting instruction, based on a difference between (i) a time of the detection of the first shooting instruction, or a shooting time of an image data piece selected by a user from among the still image data pieces generated through the pre-capture function, and (ii) a time of the detection of the second shooting instruction.

* * * * *